(12) United States Patent
Jamuna et al.

(10) Patent No.: US 11,300,099 B2
(45) Date of Patent: Apr. 12, 2022

(54) AIR DENSITY DEPENDENT TURBINE OPERATION

(71) Applicant: VESTAS WIND SYSTEMS A/S, Aarhus N (DK)

(72) Inventors: Karthik Krishnan Jamuna, Thiruvananthapuram (IN); Pankaj Dodla, Orissa (IN)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 182 days.

(21) Appl. No.: 16/603,130

(22) PCT Filed: Apr. 5, 2018

(86) PCT No.: PCT/DK2018/050063
§ 371 (c)(1),
(2) Date: Oct. 4, 2019

(87) PCT Pub. No.: WO2018/184645
PCT Pub. Date: Oct. 11, 2018

(65) Prior Publication Data
US 2020/0116126 A1    Apr. 16, 2020

(30) Foreign Application Priority Data
Apr. 5, 2017  (DK) .............. PA201770245

(51) Int. Cl.
*F03D 7/02*   (2006.01)
*F03D 7/04*   (2006.01)
*F03D 17/00*  (2016.01)

(52) U.S. Cl.
CPC .......... *F03D 7/0224* (2013.01); *F03D 7/04* (2013.01); *F03D 17/00* (2016.05)

(58) Field of Classification Search
CPC ................................... F03D 7/0224
See application file for complete search history.

(56) References Cited

U.S. PATENT DOCUMENTS 9,551,321 B2 *  1/2017  Gerber ............... F03D 7/02
9,777,708 B2 * 10/2017  Risager ............. F03D 7/024
(Continued)

FOREIGN PATENT DOCUMENTS

CN    101592127 A    12/2009
CN    102022265 A     4/2011
(Continued)

OTHER PUBLICATIONS

Chinese Office Action for Application No. 201880023700.9 dated Jun. 1, 2020.
(Continued)

*Primary Examiner* — Richard A Edgar
*Assistant Examiner* — John S Hunter, Jr.
(74) *Attorney, Agent, or Firm* — Patterson + Sheridan, LLP

(57) ABSTRACT

A wind turbine controller includes a thrust limiter for controlling the thrust of the blades of wind turbine using an estimate of the air density at the wind turbine. In one embodiment, the controller receives the blade flap load indicating the current load on one of the blades which varies linearly to the air density experienced by the wind turbine. In one embodiment, the controller determines the mean of a plurality of the blade flap load values measured during a predefined time period. Using a transfer function, the controller converts the mean of the blade flap loads to an estimate of the air density at the turbine. Generally, higher air density results in greater loads on the blades while lower air density results in lower loads on the blades.

11 Claims, 7 Drawing Sheets

(56) References Cited

U.S. PATENT DOCUMENTS

| | | | |
|---|---|---|---|
| 9,920,742 B2 * | 3/2018 | Hiremath | ............ F03D 7/02 |
| 2007/0125165 A1 | 6/2007 | Ormel et al. | |
| 2011/0064573 A1 | 3/2011 | Viripullan et al. | |
| 2012/0179376 A1 | 7/2012 | O'Brien et al. | |
| 2013/0101413 A1 | 4/2013 | Esbensen et al. | |
| 2013/0187383 A1 | 7/2013 | Esbensen et al. | |
| 2014/0178197 A1 * | 6/2014 | Risager | ............ F03D 7/042 416/1 |
| 2015/0233348 A1 | 8/2015 | Hiremath et al. | |

FOREIGN PATENT DOCUMENTS

| | | |
|---|---|---|
| CN | 102242692 A | 11/2011 |
| CN | 102562446 A | 7/2012 |
| CN | 103061979 A | 4/2013 |
| CN | 106528908 A | 3/2017 |
| EP | 2447527 A1 | 2/2012 |
| EP | 2840257 A1 | 2/2015 |
| EP | 2910777 | 4/2018 |
| WO | 2013091638 A1 | 6/2013 |
| WO | 2015192853 A1 | 12/2015 |
| WO | 2018184645 A1 | 10/2018 |

OTHER PUBLICATIONS

PCT Notification of Transmittal of the International Search Report and the Written Opinion of the International Searching Authority, or the Declaration for Application No. PCT/DK2018/050063 dated Jul. 9, 2018.

Danish Patent and Trademark Office 1st Techincal Examination Report for Application No. PA 2017 70245 dated Oct. 10, 2017.

Intellectual Property India First Examination Report for Application No. 201917043009 dated Mar. 5, 2021.

* cited by examiner

AIR DENSITY DEPENDENT TURBINE OPERATION

BACKGROUND

Field of the Invention

Embodiments presented in this disclosure generally relate to controlling blade pitch in a wind turbine using an estimate of air density.

Description of the Related Art

Wind turbines are often situated in remote areas to take advantage of prevalent weather patterns in the area. In these remote areas, the wind turbines are often exposed to extreme turbulence where wind speeds can vary widely over a short period of time (e.g., wind gusts). Turbulence adds load on the blades which may cause premature failure of components in a turbine. To ensure a turbine operates in its desired operational envelope or lifetime (e.g., twenty years), the turbine may include a thrust limiter that controls the load on the blade by measuring or estimating turbulence at the turbine. However, turbulence is not the only environmental factor that can affect loading on the blades.

SUMMARY

One embodiment of the present disclosure is a wind turbine that includes a rotor, a blade coupled to the rotor, and a controller. The controller is configured to receive a load value representing a load on the blade and estimate air density at the wind turbine using a predefined transfer function where the transfer function converts the load value into the estimated air density.

Another embodiment of the present disclosure is a method of operating a wind turbine. The method includes receiving a load value representing a load on a blade where the blade is coupled to a rotor of the wind turbine. The method also includes estimating air density at the wind turbine using a predefined transfer function, wherein the transfer function converts the load value into the estimated air density.

Another embodiment of the present disclosure is a controller that includes a processor and a memory configured to store a program, which when executed by the processor performs an operation. The operation includes receiving a load value representing a load on a blade where the blade is coupled to a rotor of the wind turbine and estimating air density at the wind turbine using a predefined transfer function where the transfer function converts the load value into the estimated air density.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments herein describe a controller for a wind turbine that includes a thrust limiter for controlling the thrust of the blades of wind turbine using an estimate of the air density at the wind turbine. In one embodiment, the controller receives the blade flap load indicating the current load on one of the blades which varies linearly to the air density experienced by the wind turbine.

Air density is the mass per unit volume of the atmosphere which can change according to variations in altitude, temperature, and humidity. Moreover, air density affects the loading on the blades of the turbine. For example, greater air density can increase loading on rotating blades relative to operating the wind turbine when air density is decreased.

In one embodiment, the controller determines the mean of a plurality of the blade flap load values measured during a predefined time period. Using a transfer function, the controller converts the mean of the blade flap loads to an estimate of the air density at the turbine. Generally, higher air density results in greater loads on the blades while lower air density results in lower loads on the blades. The controller can scale the blade pitch value using the estimate of the air density which can improve the power output of the wind turbine while still ensuring the turbine is within its operational envelope.

In other embodiments, the controller may scale the blade pitch value using the wind speed at the turbine. For example, the controller can determine different load levels and determine the maximum load level for the current wind speed. At lower wind speeds, the controller can scale the control signal for the pitch of the blades to increase the thrust or load on the blades. A higher wind speeds, the controller may pitch the blades to reduce the thrust so that the turbine remains in the operational envelope. In addition to air density and wind speed, the controller may also limit the thrust of the blades in response to turbulence at the turbine.

EXAMPLE EMBODIMENTS

Figure 1:
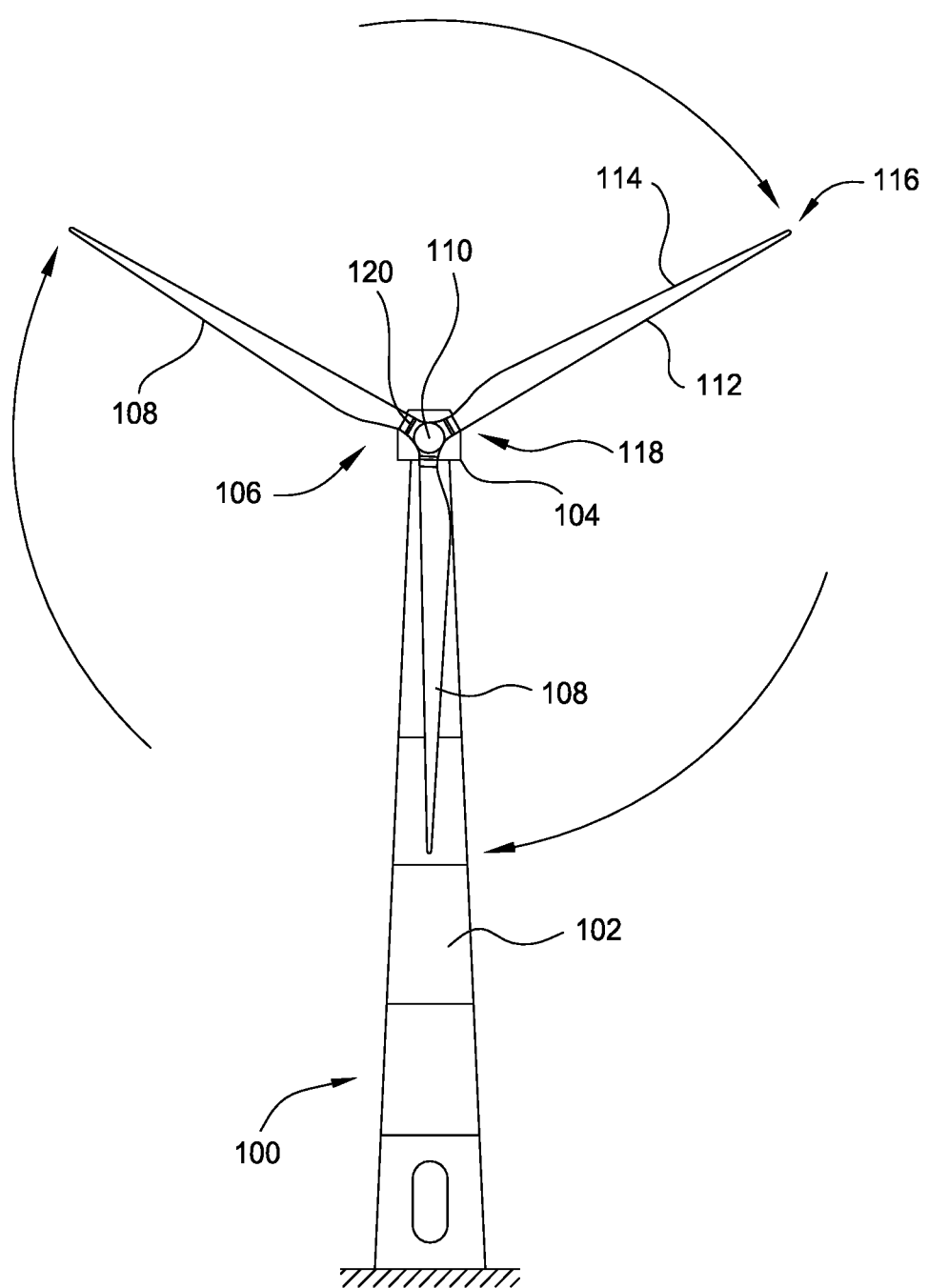
FIG. 1 illustrates a diagrammatic view of a wind turbine, according to an embodiment described in this present disclosure.

FIG. 1 illustrates a diagrammatic view of a horizontal-axis wind turbine generator 100. The wind turbine generator 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
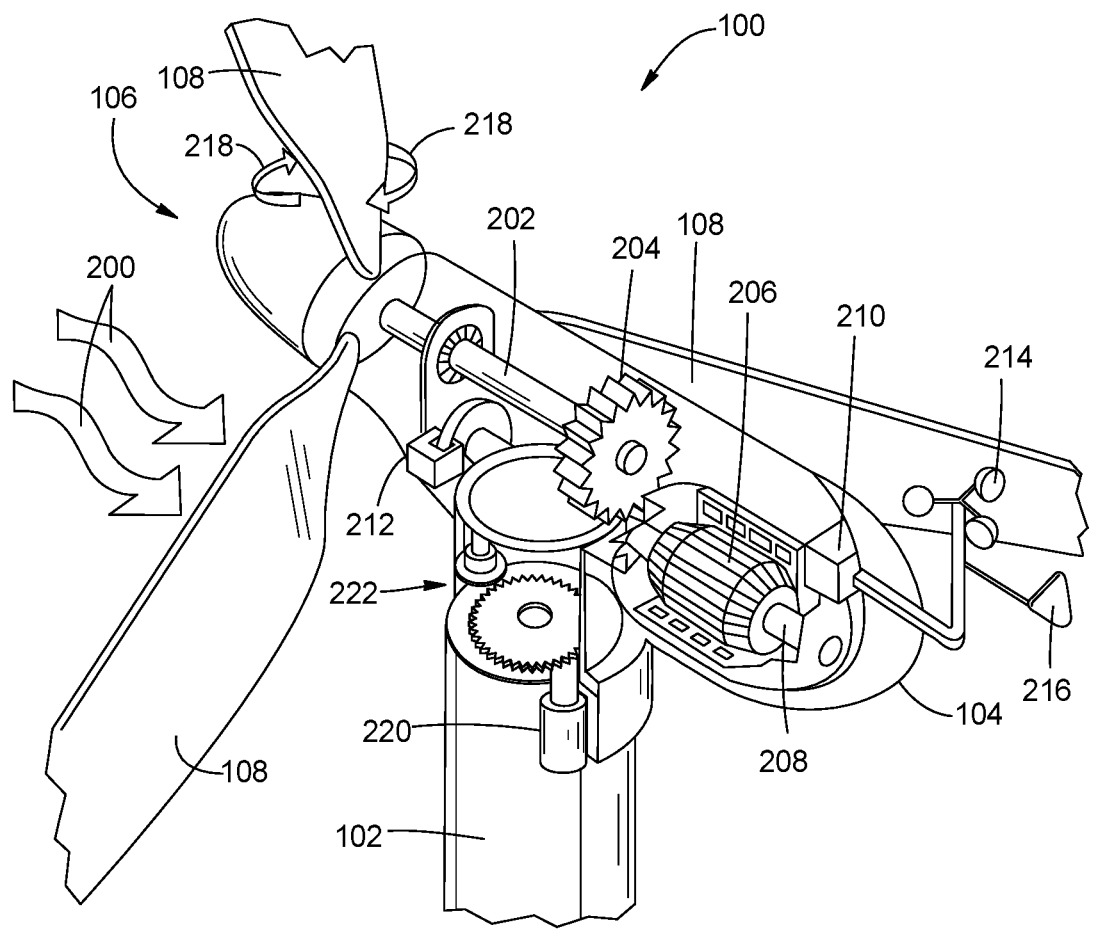
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of a wind turbine generator 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206. Also gearless turbines, i.e. the so-called direct drive turbines, exists. Such turbines may also be relevant for embodiments of the present invention.

A controller 210 may sense the rotational speed of one or both of the shafts 202, 208. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind. A braking system 212 may also be present, the braking system is normally used to bring a slowly rotating rotor to a complete stop.

Figure 3:
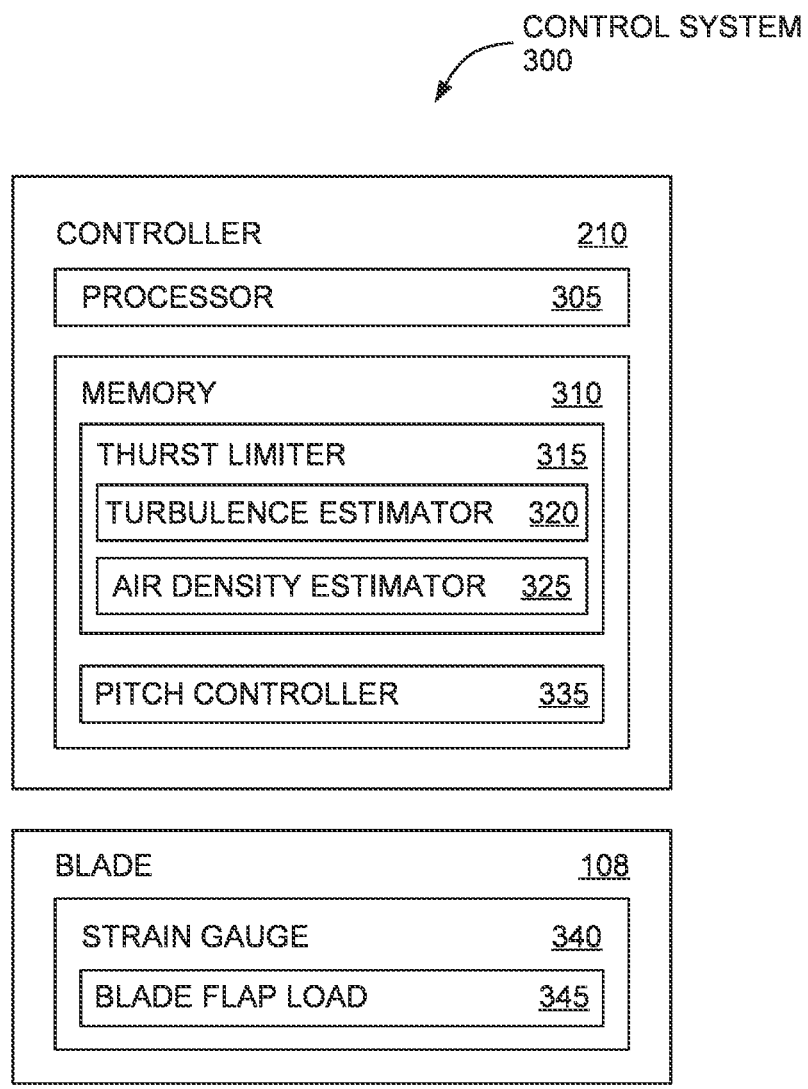
FIG. 3 illustrates a controller for operating a wind turbine according to an embodiment described in this present disclosure.

FIG. 3 illustrates control system 300 comprising a controller 210 for operating a wind turbine according to an embodiment described in this present disclosure. The controller 210 includes a processor 305 and memory 310. The processor 305 can represent one or more processing elements which each can include one or more processing cores. The memory 310 can include volatile memory elements, nonvolatile memory elements, and combinations thereof.

The memory 310 includes a thrust limiter 315 and a pitch controller 335. In one embodiment, the thrust limiter 315 and pitch controller 335 are software components whose functions are executed using the processor 305. However, in other embodiments, the thrust limiter 315 and the pitch controller 335 may be formed entirely from hardware elements or from a combination of hardware and software elements.

In one embodiment, the thrust limiter 315 outputs a control signal for affecting the thrust or load on the blades of the turbines. The control signal provided by the thrust limiter 315 may reduce the load on the blades relative to the load on the blades set by a controller without the thrust limiter 315. For example, the controller may have a separate system that sets the thrust of the blades based on a desired power curve or operational mode. The control signal outputted by the thrust limiter 315 can scale the output value of the separate system. In one embodiment, the control signal outputted by the thrust limiter 315 is an input to the pitch controller 335 which outputs pitch control signals for setting the pitch of the blades. Although in some situations the thrust limiter 315 reduces the load on the blades, in other scenarios the thrust limiter 315 may increase the load on the blades. As described below, if turbulence, air density, and wind speed is low, the thrust limiter 315 may output a control signal that causes the pitch controller to increase the thrust on the blades, and thus, increase the power generated by the wind turbine. In one embodiment, the thrust limiter 315 increases the thrust on the blades to the level at which the turbine operates at (or at least closer to) the aerodynamical optimal pitch curve for the turbine (sometimes referred to as the fine pitch). In one embodiment, the aerodynamic optimal pitch curve is a table which specifies the pitch angle in view of rotor speed and wind speed at which to operate to achieve the optimum turbine operation in the partial load region. Operation according to the aerodynamical optimal pitch curve results in the maximum power coefficient (Cp) (due to the pitch angle providing an optimal Angle of Attack). During unfavourable/harsh climate conditions, the turbine can operate with a greater pitch angle than the optimum pitch angle to reduce loads. At benign climate conditions (e.g., where turbulence, air density, and/or wind speed are low) the thrust limiter 315 can increase the thrust by pitching into the wind corresponding to a pitch angle indicated by (or at least closer to) the aerodynamical optimal pitch curve.

The thrust limiter 315 includes a turbulence estimator 320 and an air density estimator 325. The turbulence estimator 320 estimates turbulence at the turbine. Generally, the turbulence is a measure of the variation of the wind at the turbine. That is, a steady or constant wind speed results in very little or no turbulence, while frequent wind gusts or large changes in wind speed result in more turbulence. Turbulent wind conditions cause the load on the blades to vary thus making it difficult for the controller 210 to ensure the turbine remains within its operational envelope (e.g., a twenty year lifetime). Thus, when the turbulence estimator 320 indicates the turbine is experiencing turbulent wind conditions, the thrust limiter may reduce the thrust or load on the blades by instructing the pitch controller 335 to pitch out the blades so that more wind is permitted to pass through the rotor plane. During non-turbulent wind conditions, the thrust limiter 315 may not change the thrust on the blade or can increase the thrust on the blades. For example, the pitch controller 335 may output a blade pitch value that assumes some minimum amount of turbulence. However, if the turbulence estimator 320 indicates the turbulence is less than the minimum amount, the thrust limiter 315 can instruct the pitch controller 335 to increase the thrust or load on the blades which can permit the turbine to output additional power (if the power output is currently below the rated (i.e., maximum) output power).

In one embodiment, the turbulence estimator 320 estimates the turbulence from a blade flap load 345. As shown in FIG. 3, the blade 108 includes a strain gauge 340 which may be disposed at a base of the blade 108 at, or near, where the blade 108 connects to the rotor hub. The strain gauge 340 outputs a blade flap load 345 at intervals (e.g., every 10 milliseconds) that represents the load on the blade 108. In various examples, the load measured by the strain gauge 340 may be a blade flap or edge load or result from hub, main bearing, or tower loads (or combinations thereof) that cause a deflection of the blade. For example, if the wind increases (but the pitch angle remains constant), the blade flap load 345 outputted by the strain gauge 340 increases.

In one embodiment, the turbulence estimator 320 measures turbulence by evaluating the standard deviation of the blade flap load 345. For example, the turbulence estimator 320 may determine the standard deviation for a plurality of blade flap load values measured over a predefined time period (e.g., 10 seconds). A wider standard deviation indicates a wider range of wind speeds experienced at the wind turbine, and thus, a greater amount of turbulence. However, a narrower standard deviation indicates a smaller range of wind seeds at the wind turbine indicating a lower amount of turbulence. As described in more detail below, the thrust limiter 315 can use the turbulence derived from the standard deviation of the blade flap load 345 to adjust the thrust on the blade 108.

In one embodiment, the air density estimator 325 derives an estimate of the air density at the wind turbine from the blade flap load 345. To do so, the air density estimator 325 may calculate the mean for a plurality of blade flap load values measured over a predefined time period (e.g., 10 seconds). Generally, an increase of the air density at the turbine results in the mean (or average) of the blade flap load values increasing, and vice versa. In some turbines, the mean of the blade flap load values varies linearly with the air density.

In one embodiment, the air density estimator 325 uses a predefined transfer function to convert the mean of the blade flap load values to a corresponding estimate of air density. The transfer function may be generated using a turbine simulator where a simulated wind turbine is operated in a range of air densities where the wind speed is swept over a range of wind speeds for each of the different air densities. By evaluating the effect of the different air densities on the mean of the blade flap load, the turbine simulator can generate the transfer function which the air density estimator 325 then uses to convert the blade flap loads 345 measured by the strain gauge 340 into estimates of air density. Like with turbulence, the thrust limiter 315 adjusts the thrust on the blades in response to changes in the estimate air density.

Although not shown, the thrust limiter 315 may also use the wind speed to control the thrust on the blade 108. At lower wind speeds, the thrust limiter 315 may permit the pitch controller 335 to increase the load or thrust on the blade 108 to reach the optimum pitch angle of operation according to, e.g., the aerodynamical optimal pitch curve but limit the load on the blade 108 as the wind speed increases.

Figure 4:
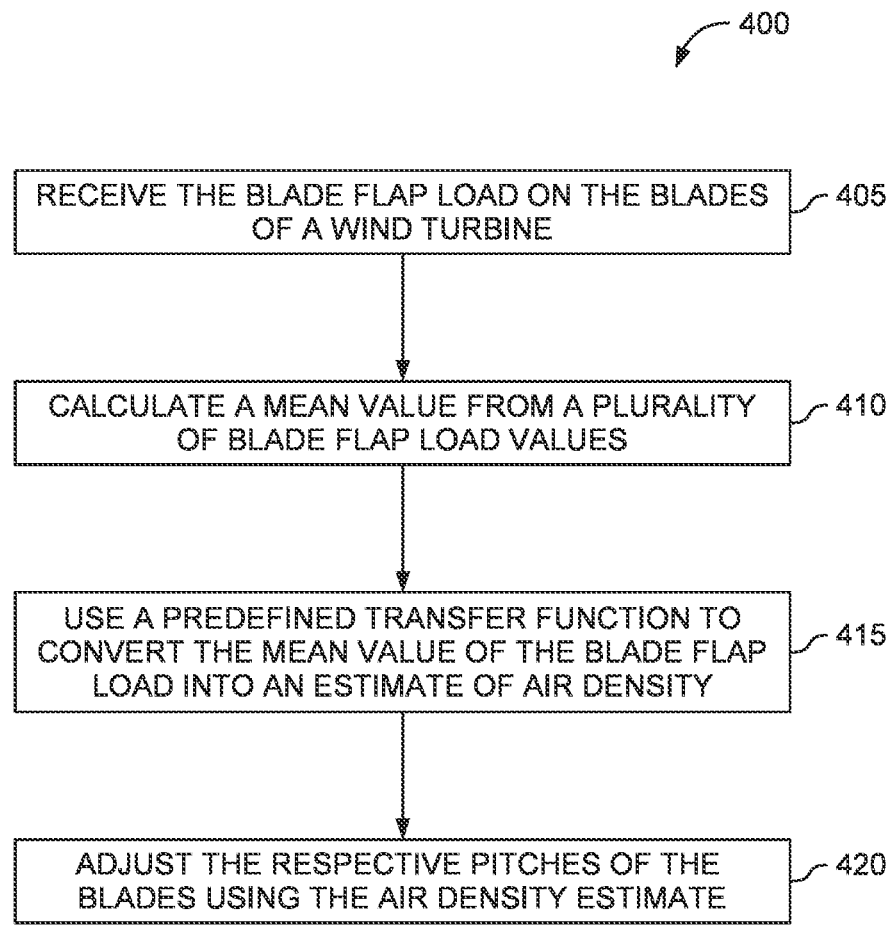
FIG. 4 is a flow chart for operating a wind turbine using an estimate of air density according to an embodiment described in this present disclosure.

FIG. 4 is a flow chart of a method 400 for operating a wind turbine using an estimate of air density according to an embodiment described in this present disclosure. At block 405, the thrust limiter receives the blade flap load on at least one blade of the wind turbine. In one embodiment, the blade flap load is generated from a strain gauge disposed on a blade or at the connection point between the blade and the rotor hub as described in FIG. 3.

Alternatively, instead of directly measuring the blade flap load, the controller can estimate the blade flap load using a blade element momentum (BEM) model, which will be understood by the person of ordinary skill in the art. In one embodiment, the controller uses the current pitch angle to determine the Angle of Attack (AoA) of the blades. Using the AoA, the rotor speed, and the wind speed at the turbine, the BEM model can generate an estimate of the blade flap load. Thus, in this embodiment, a strain gauge can be omitted.

In one embodiment, the controller uses the estimated blade flap load outputted by the BEM model to back up or check the blade flap load provided by the strain gauge. For example, if the strain gauge breaks and no longer outputs the blade flap load, the controller can calculate the blade flap load from the BEM model using the AoA of the blades and the wind speed. In this manner, the BEM model can be used as a back up to the strain gauge.

In another example, the controller may compare the blade flap load measured using the strain gauge to the estimated blade flap load outputted by the BEM model. That is, the BEM model may generate the estimated blade flap load in parallel with the strain gauge capturing blade flap load measurements. The controller can compare the measured and estimated blade flap loads to ensure that the strain gauge has not malfunctioned. For example, if the measured blade flap load is more than a predefined threshold (e.g., more than 10%) from the estimated blade flap load, then the controller may determine the strain gauge has malfunctioned and switch the operation of the turbine into a safe mode. That is, because the blade flap load values may be inaccurate, the controller may change the mode of operation of the turbine to minimize the risk that the turbine operates outside of its operational envelope and cause too much thrust on the blades. In this manner, the BEM model can provide a check value for ensuring the blade flap load is reliable.

Regardless whether the blade flap load is measured using a strain gauge or estimated using the BEM model, at block 410 the controller calculates a mean value from a plurality of blade flap load values. In one embodiment, the controller determines the mean or average for the blade flap load values received over a predetermined amount of time (e.g., every 10 seconds). In another embodiment, the controller determines the mean when a predefined number of blade flap load values are received (e.g., each time the controller receives a thousand load values). As mentioned above, the mean of the blade flap values is correlated to the air density at the wind turbine and is independent of turbulence. Put differently, turbulence is related to the standard deviation of the blade flap load values which is independent of the mean of those values. Thus, even as the mean of the blade flap load values changes (e.g., increases or decreases), the turbulence may remain the same. Stated differently, the amount of variation in the blade flap values can change without the mean of those values changing. Thus, air turbulence can change if the air density remains constant and vice versa.

At block 415, the thrust limiter uses a predefined transfer function to convert the mean value of the blade flap load into an estimate of air density. As mentioned above, environmental factors such as humidity and temperature affect the air density which in turn affects the loading on the rotating blades. In one embodiment, the transfer function provides a relationship between changes in the mean of a plurality of blade flap load values and changes in the air density at the wind turbine.

The transfer function can scale the mean of the plurality of blade flap loads to derive the air density estimate. For example, the transfer function may include a constant value where changes in the mean of the plurality of blade flap loads result in linear changes to the air density estimate. In another embodiment, the transfer function may perform a non-linear conversion between changes in the mean of the plurality of blade flap loads and the air density estimate.

In one embodiment, the transfer function is derived using a turbine simulator where a simulated turbine is operated in different air densities to determine the effect of the air density on the blade flap load, or more specifically, how the mean of the blade flap load correlates to the air density. This correlation can then be used as the transfer function for converting the blade flap load received at block 405 into a corresponding estimate of air density.

In another embodiment, the transfer function is derived by measuring the air density at the site and correlating changes in air density to the blade flap load on the blades. For example, a technician may temporarily place a sensor or sensors at the turbine which measure the air density while the turbine is operating. By comparing the air density to the mean of a plurality of blade flap load values, the controller can determine the transfer function which defines the correlation between these values. After identifying the transfer function, the thrust limiter can use the transfer function to convert the blade flap loads into estimates of air density. Thus, the sensors for measuring the air density can be moved to a different turbine where the transfer function for that turbine is identified. In this manner, the turbines do not need permanent sensors for measuring the air density, but instead, can use the derived transfer function to estimate the air density from updated blade flap load values. Doing so permits the controller to generate a customized transfer function for each wind turbine using real-world measurements of the air density at the turbine and the effect of the air density on blade loading.

At block 420, the thrust limiter adjusts the respective pitches of the blades using the air density estimate. As the air density increases, the thrust limiter may reduce the thrust or load on the blades by pitching out the blades. In contrast, as the air density decreases, the thrust limiter may increase the thrust of the blades by pitching in the blades (e.g., pulling more mechanical energy from the wind). The controller may also increase the power outputted by the wind turbine. For example, if the output power of the wind turbine is below the rated output power (e.g., the maximum power output of the turbine set by the manufacture), the controller may increase the output power of the turbine as the blades are pitched in (as determined by a power coefficient (Cp) curve for the current wind speed). Thus, adjusting the pitch of the blades in response to changes in air density can increase the power efficiency of the blade (since the power output can be increased when air density is low, all else being equal) and keep the turbine in its operational envelope to satisfy a desired lifetime of the turbine (by pitching out the blades to reduce wear and tear on the blades when air density is high).

In one embodiment, the wind turbine controller estimates a thrust on the blades using the load measured by the thrust limiter. The controller can use this estimate of thrust for other control operations such as reducing the noise generated by the turbine or controlling the wake or turbulence generated by the wind turbine that affects downstream turbines. The load, noise, and wake operations may include specific constraints or thresholds corresponding to the thrust estimated by the thrust limiter.

Figure 5:
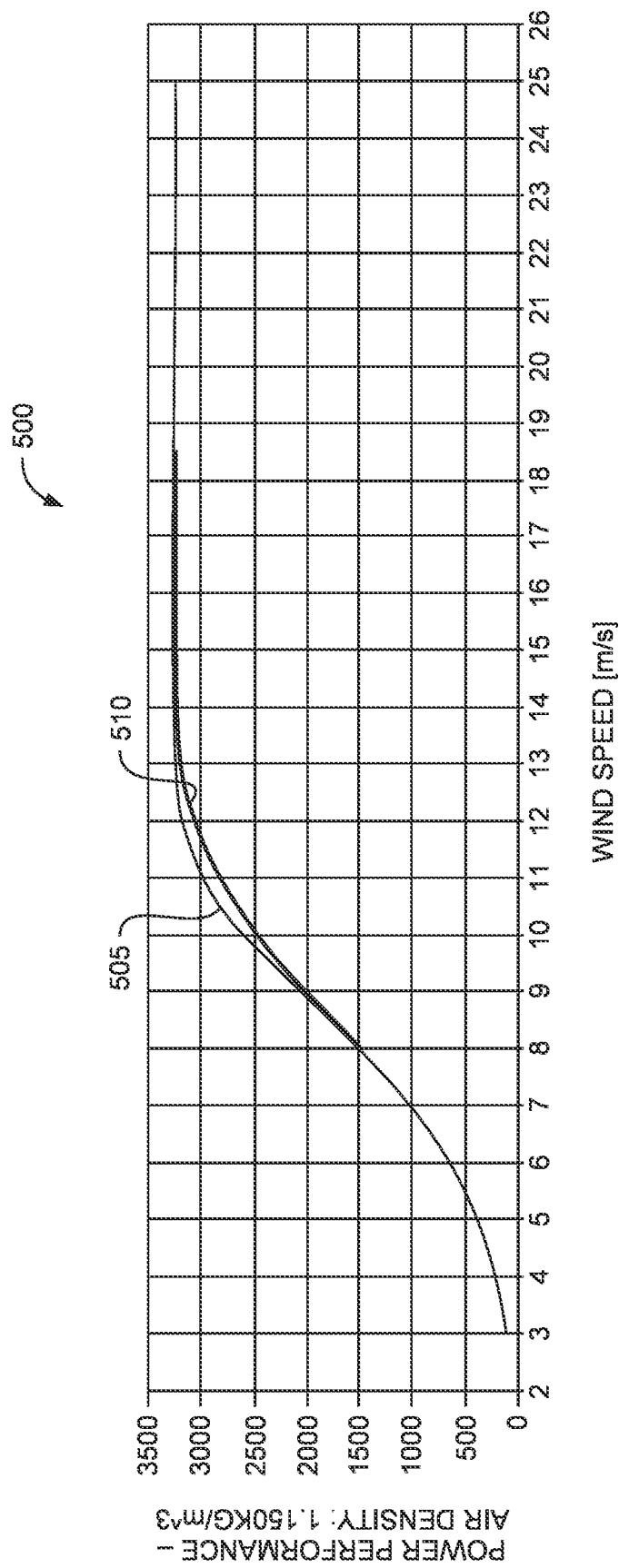
FIG. 5 illustrates power curves for operating a wind turbine with and without considering air density according to an embodiment described in this present disclosure.

FIG. 5 illustrates a chart 500 that includes power curves 505 and 510 for operating a wind turbine with and without considering air density according to an embodiment described in this present disclosure. The power curve 505 illustrates operating the wind turbine using air density to control the output power of the curve by controlling, for example the output of the generator or the pitch of the blades. In contrast, the power curve 510 illustrates operating the wind turbine without using air density to control output power or the loading on the blades.

As shown in the chart 500, the overall operation of the wind turbine is more efficient—e.g., generates more power—when using the air density to operate the wind turbine than when not using the air density. As described above, when below the rated wind speed, when air density is low the turbine can be operated to generate more output power than it would otherwise. As such, the annual energy production (AEP) of the wind turbine may be increased when using air density to determine output power of the wind turbine.

Figure 6:
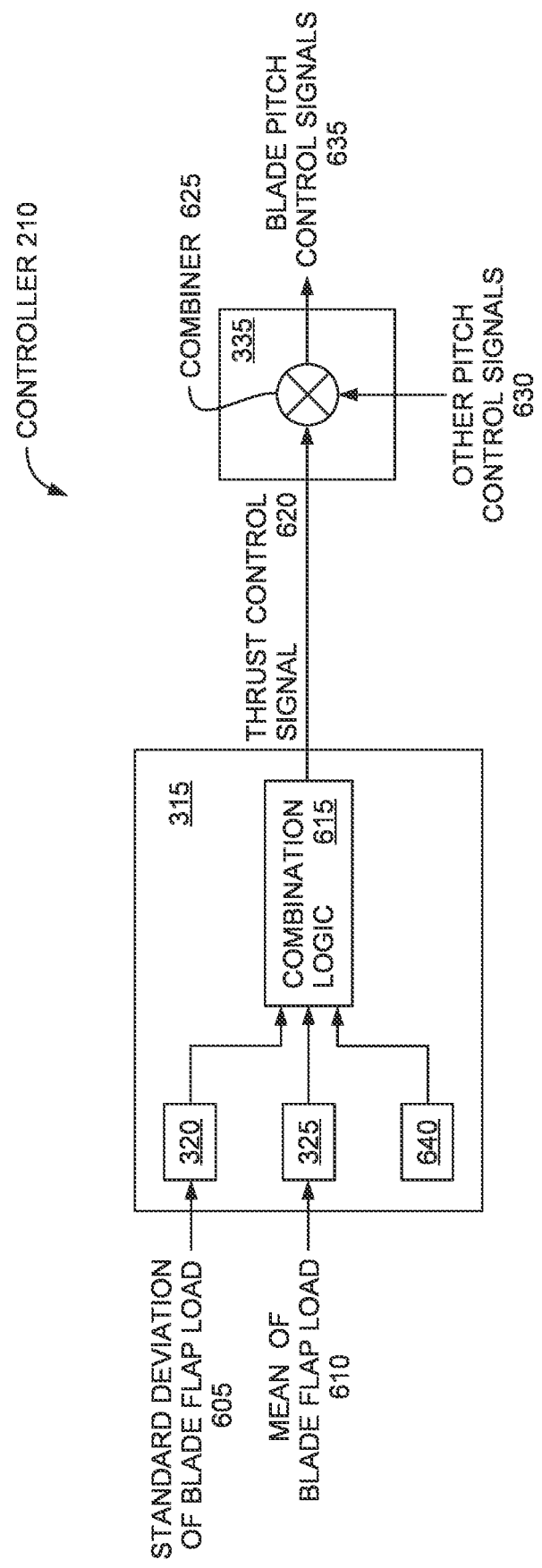
FIG. 6 illustrates a controller for operating a wind turbine using air density, turbulence, and wind speed according to an embodiment described in this present disclosure.

FIG. 6 illustrates a controller 210 for operating a wind turbine using air density, turbulence, and wind speed according to an embodiment described in this present disclosure. The controller 210 includes the thrust limiter 315 and the pitch controller 335 which outputs blade pitch control signals 635. In this embodiment, the thrust limiter 315 receives the standard deviation of the blade flap load 605 and the mean of the blade flap load 610 which are inputted into the turbulence estimator 320 and air density estimator 325, respectively. Although in FIG. 6 the standard deviation of the blade flap load 605 and the mean of the blade flap load 610 are calculated outside of the thrust limiter 315 (e.g., by another component in the turbine controller 210 or by a system external to the wind turbine), in another embodiment, the thrust limiter 315 receives the blade flap load values outputted by a strain gauge or estimates for these loads from a BEM model. The thrust limiter 315 can calculate the standard deviation and mean of these values which are then inputted into the turbulence estimator 320 and the air density estimator 325.

The turbulence estimator 320 uses the standard deviation of the blade flap load 605 to output a control signal which affects the blade pitch control signals 635. In another embodiment, the turbulence estimator 320 uses the standard deviation of the rotor power or speed estimate to measure turbulence. As mentioned above, wider standard deviations can indicate greater amounts of turbulence at the wind turbine.

That is, the wind speeds fluctuate widely which results in wider fluctuations (i.e., standard deviation) of the blade flap loads. In one embodiment, the turbulence estimator 320 outputs a control signal indicating that the blades should be pitched out to reduce loading as the turbulence increases but indicate that the blades should be pitched in to increase loading as the turbulence decreases.

The air density estimator 325 uses the mean of the blade flap load to output a signal that affects the blade pitch control signals 635 as described in the method 400. In one embodiment, the mean of the blade flap load is determined using a predefined time interval—e.g., every 10 seconds or every minute. The mean can be calculated by adding the blade flap load values measured during the predefined time interval and dividing this sum by the total number of values measured. As discussed above, the mean values can be correlated to the air density at the wind turbine. Using a transfer function, the air density estimator 325 converts the mean of the blade flap load 610 into an estimate of air density. In one embodiment, as the air density estimate increases, the output signal of the air density estimator 325 reduces loading on the blades by affecting the blade pitch control signals 635. However, as the air density estimate decreases, the output signal of the air density estimator 325 increase loading on the blades by affecting the blade pitch control signals 635.

The thrust limiter 315 also includes a wind speed module 640 which outputs a signal that varies according to the wind speed at the wind turbine. In one embodiment, the wind speed module 640 receives a current wind speed at the wind turbine that is measured using a sensor (e.g., an anemometer) or estimated using a turbine modeling application. In one embodiment, as the wind speed increase, the wind speed module 640 outputs a signal that decreases the loading on the blades by affecting the blade pitch control signals 635. However, as the wind speed decreases, the wind speed module 640 outputs a signal that may increase the loading on the blades.

The respective outputs of the turbulence estimator 320, air density estimator 325, and wind speed module 640 are transmitted to combination logic 615 which outputs a thrust control signal 620 to the pitch controller 335. That is, the combination logic 615 uses the outputs of the turbulence estimator 320, air density estimator 325, and wind speed module 640 as inputs to provide the signal 620 that affects the blade pitch control signals 635. The combination logic 615 may combine the outputs of the turbulence estimator 320, air density estimator 325, and wind speed module 640 in any number of different ways. For example, the combination logic 615 may provide a weight or priority to each of the outputs which determines how each of the outputs affect the thrust control signal 620. For instance, one of the outputs may be weighted more heavily than the other outputs. In another example, the combination logic 615 may compare the three outputs to respective thresholds for identifying a value of the thrust control signal 620. For instance, the combination logic 615 may output different values of the thrust control signal 620 for given output values of the turbulence estimator 320 and the air density estimator 325 depending on if the current wind speed is above or below a threshold.

The pitch controller 335 uses a combiner 625 to combine the thrust control signal 620 provided by the thrust limiter 315 with other pitch control signals 630 (if any). For example, the other pitch control signals 630 may be generated by another component in the controller 210—e.g., a power controller. The power controller may set the pitch control signals 630 based on a desired output power and the current wind speed. In another example, the controller 210 may set the pitch control signals 630 depending on the mode of the turbine—e.g., whether the turbine is operating in a start-up mode, safe mode, normal mode, shutdown mode, etc. The combiner 625 combines the thrust control signal 620 form the thrust limiter with the pitch control signals 630 to output the blade pitch control signals 635 which, in one embodiment, are used to control actuators on the hub which set the pitch on the blades.

Although FIG. 6 illustrates that the pitch controller 335 includes the combiner 625, this does not necessary imply that the thrust control signal 620 and the other pitch control signals 630 always added together. In some instances, when combining the thrust control signal 620 with the other pitch control signals 630, the thrust control signal 620 may reduce the loading on the blades (e.g., reduce the thrust of the blades) than if only the pitch control signals 630 is used to generate the blade pitch control signals 635. However, in other instances, the thrust control signal 620 may increase the loading on the blades (e.g., increase the thrust of the blades) than if only the pitch control signals 630 are used to generate the blade pitch control signals 635. For example, referring to the chart 500 in FIG. 5, the thrust control signal 620 (which is affected by air density) may increase the loading on the blades at the wind speeds of 9 to 14 m/s to output more power than would otherwise be outputted if air density (and the thrust control signal 620) did not affect the blade pitch control signals 635.

Figure 7:
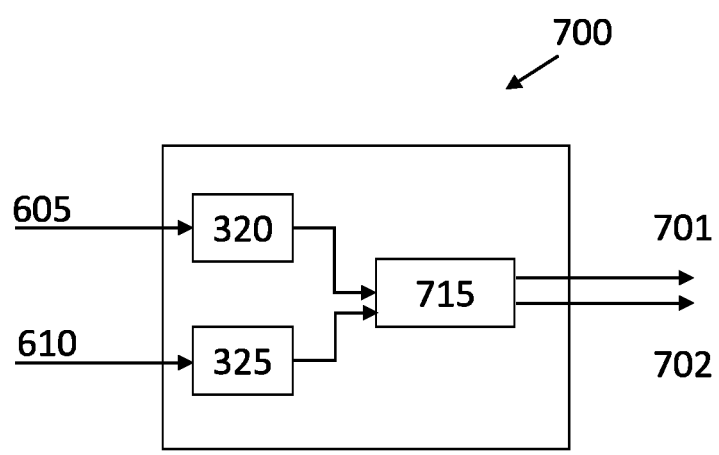
FIG. 7 illustrates an embodiment comprising a control unit which based on load values of the blade determines one of, or both of, a cut-in value and/or a cut-out value.

FIG. 7 illustrates an embodiment comprising a control unit 700 which based on load values of the blade determines one of, or both of, a cut-in value 701 and/or a cut-out value 702. In the illustrated embodiment the values are determined based on the mean of the blade flap load 610, to determine the air density by use of the air density estimator 325. In an embodiment, also the standard deviation of the blade flap load 605 may be used to determine a turbulence value by used of the turbulence estimator 320.

The estimated air density and optionally the determined turbulence is inserted into a cut-in/cut-out unit 715, which can determine an adjusted cut-in and/or cut-out value for use by the controller of the turbine to dynamically change the cut-in or cut-out wind speed.

For instance, if the cut-in/cut-out unit 715 is estimating very low air density and turbulences, the unit 715 direct the turbine controller to change the present cut-out wind speed to a higher cut out wind speed due to benign climatic condition. This enables the turbine to operate to a higher cut out wind speed. In the same way, if the air density is high, the cut-in wind speed can be reduced and this enables to have the turbine in operation at a lower wind speed than the present cut-in wind speed.

The determination of adjusted cut-out and cut-in values by the cut-in/cut-out unit 715 can be included from a predetermined look up table based on the air density and turbulence estimator outputs. The cut-in/cut-out unit 715 may include a combination logic which provides a weight or priority to each of the outputs.

The exact values dependent on the given turbine model. In the example power curve shown on FIG. 5, the cut-in value is 3 m/s. In embodiments, the cut-in value may be lowered by 1-2 m/s for high air density situations. In the example power curve shown on FIG. 5, the cut-out value is 25 m/s. In embodiments, the cut-out value may be raised by 1-10 m/s for low air density situations in view of the turbulence level.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figs. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A wind turbine comprising:
a rotor;
a blade coupled to the rotor; and
a controller configured to:
  during power production by the wind turbine, receive a plurality of load values representing loads on the blade over a period of time;
  determine a mean of the plurality of load values;
  determine a standard deviation of the plurality of load values;
  convert, using a predefined transfer function, the mean of the plurality of load values into an air density at the wind turbine;
  estimate, based on the standard deviation of the plurality of load values, a turbulence at the wind turbine; and
  adjust a pitch of the blade based on the air density and the turbulence.

2. The wind turbine of claim 1, further comprising a strain gauge disposed on the blade, the strain gauge configured to measure the plurality of load values.

3. The wind turbine of claim 1, wherein the plurality of load values are blade flap loads of the blade.

4. The wind turbine of claim 1, wherein the controller is further configured to adjust a cut-in value or a cut-out value based on the air density.

5. The wind turbine of claim 1, wherein the controller further is configured to:
receive a current wind speed at the wind turbine; and
generate a thrust control signal based on the current wind speed, the turbulence, and the air density.

6. A method of operating a wind turbine, the method comprising:
during power production by the wind turbine, receiving a plurality of load values representing loads on a blade over a period of time, the blade is coupled to a rotor of the wind turbine;
determining a mean of the plurality of load values;
determining a standard deviation of the plurality of load values;
converting, using a predefined transfer function, the mean of the plurality of load values into an air density at the wind turbine;
estimating, based on the standard deviation of the plurality of load values, a turbulence at the wind turbine; and
adjusting a pitch of the blade based on the air density and the turbulence.

7. The method of claim 6, further comprising measuring the plurality of load value using a strain gauge disposed on the blade.

8. The method of claim 6, further comprising:
receiving a current wind speed at the wind turbine; and
generating a thrust control signal based on the current wind speed, the turbulence, and the air density.

9. The method of claim 6, further comprising adjusting a cut-in value or a cut-out value based on the air density.

10. A controller for a wind turbine, comprising:
a processor; and
a memory configured to store a program, which when executed by the processor performs an operation comprising:
  during power production by the wind turbine, receiving a plurality of load values representing loads on a blade over a period of time, the blade is coupled to a rotor of the wind turbine;
  determining a mean of the plurality of load values;
  determining a standard deviation of the plurality of load values;
  converting, using a predefined transfer function, the mean of the plurality of load values into an air density at the wind turbine;
  estimating, based on the standard deviation of the plurality of load values, a turbulence at the wind turbine; and
adjusting a pitch of the blade based on the air density and the turbulence.

11. The controller of claim 10, the operation further comprising measuring the plurality of load values using a strain gauge disposed on the blade.

* * * * *